United States Patent
Roos et al.

(10) Patent No.: US 9,388,075 B2
(45) Date of Patent: Jul. 12, 2016

(54) GRANULAR PUMICE AND METHOD FOR PRODUCING GRANULAR PUMICE

(71) Applicant: Evonik Degussa GmbH, Essen (DE)

(72) Inventors: Markus Roos, Essen (DE); Guido Runkel, Melsbach (DE)

(73) Assignees: Evonik DeGussa GmbH, Essen (DE); ROTEC Rohstoff-Technik GmbH & Co. Kg, Urmitz (DE)

( * ) Notice: Subject to any disclaimer, the term of this patent is extended or adjusted under 35 U.S.C. 154(b) by 0 days.

(21) Appl. No.: 14/477,348

(22) Filed: Sep. 4, 2014

(65) Prior Publication Data

US 2014/0370294 A1    Dec. 18, 2014

Related U.S. Application Data

(63) Continuation of application No. 13/699,894, filed as application No. PCT/EP2011/053287 on Mar. 4, 2011, now Pat. No. 8,859,096.

(30) Foreign Application Priority Data

May 26, 2010  (DE) .......................... 10 2010 021 532

(51) Int. Cl.
| | | |
|---|---|---|
| C04B 20/00 | (2006.01) | |
| C04B 14/16 | (2006.01) | |
| C04B 28/00 | (2006.01) | |
| C08J 7/04 | (2006.01) | |
| C08J 7/06 | (2006.01) | |
| C08K 3/36 | (2006.01) | |
| C09D 4/00 | (2006.01) | |
| C09D 183/04 | (2006.01) | |
| C04B 20/10 | (2006.01) | |

(52) U.S. Cl.
CPC ............... *C04B 20/004* (2013.01); *C04B 14/16* (2013.01); *C04B 20/1037* (2013.01); *C04B 28/00* (2013.01); *C08J 7/047* (2013.01); *C08J 7/06* (2013.01); *C08K 3/36* (2013.01); *C09D 4/00* (2013.01); *C09D 183/04* (2013.01); *C08J 2483/04* (2013.01); *Y10T 428/2991* (2015.01); *Y10T 428/2993* (2015.01); *Y10T 428/2995* (2015.01); *Y10T 428/2996* (2015.01); *Y10T 428/2998* (2015.01)

(58) Field of Classification Search
CPC .... C04B 14/16; C04B 28/00; C04B 20/1037; C04B 20/1051; C04B 20/004; C04B 20/1044; C04B 20/1025; C04B 20/1022; C04B 20/04; C08J 7/047; C08J 7/06; C08K 3/36; C09D 4/00; C09D 183/04; Y10T 428/2998; Y10T 428/2993; Y10T 428/2991; Y10T 428/2996; Y10T 428/2995
USPC ................. 428/402, 405; 427/213.3
See application file for complete search history.

(56) References Cited

U.S. PATENT DOCUMENTS 4,231,884 A * 11/1980 Dorius ............................. 252/62
8,859,096 B2 * 10/2014 Roos et al. .................... 428/403

* cited by examiner

*Primary Examiner* — Leszek Kiliman
(74) *Attorney, Agent, or Firm* — Frommer Lawrence & Haug LLP

(57) ABSTRACT

The invention relates to granular pumice, wherein the surface is covered with a hydrophobic coating.

17 Claims, No Drawings

GRANULAR PUMICE AND METHOD FOR PRODUCING GRANULAR PUMICE

The present application is a continuation of U.S. patent application Ser. No. 13/699,894 filed on Nov. 26, 2013, which claims priority from PCT Patent Application No. PCT/EP2011/053287 filed on Mar. 4, 2011, which claims priority from German Patent Application No. DE 10 2010 021 532.5 filed on May 26, 2010, the disclosures of which are incorporated herein by reference in their entirety.

FIELD OF THE INVENTION

The invention relates to granular pumice, wherein the surface is covered with a hydrophobic coating.

It is noted that citation or identification of any document in this application is not an admission that such document is available as prior art to the present invention.

Granular pumice is used primarily as lightweight aggregate for a variety of building products and building chemical products. Mention may be made of plasters and renders and mortars, fine concretes, exterior wall cladding boards and lightweight boards and also fire and noise protection boards, insulation products and the like. However, granular pumice is also used as lightweight aggregate for plastics. The advantages of granular pumice are its very low weight, the high compressive strength and also very good thermal insulation. It is also well suited for sound absorption, displays a high breathing activity, is not combustible and is solvent-free and has a neutral odor, and also is 100% mineral and recyclable.

However, as a mineral, porous natural product, pumice displays a certain water absorption capability. As a result, when pumice is used as lightweight aggregate wherever water is used for mixing, somewhat more water has to be added compared to a lightweight aggregate having no water absorption capability or a significantly lower water absorption capability, for example the siliceous foams which are likewise frequently used. This results in the productivity of the mixed composition containing the added pumice being somewhat lower than the productivity of a composition having, for example, siliceous foam as lightweight aggregate.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of any previously described product, method of making the product, or process of using the product.

SUMMARY OF THE INVENTION

The invention therefore addresses the problem of providing a granular pumice whose properties are improved, especially for use as lightweight aggregate to produce a composition to be made up using a liquid.

To solve this problem, the invention provides for the surface of the granular pumice to have a hydrophobic coating.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The granular pumice according to the invention, which as a natural material has a certain water absorption capability, is, according to the invention, coated with a hydrophobic surface coating and is thus hydrophobicized. This surface layer applied by means of appropriate treatment of the pumice results in the pumice granules being completely hydrophobic and retaining their hydrophobic property, as long-term experiments have shown. The hydrophobic surface coating consequently gives the granular pumice of the invention a property which has previously not been ensured and has a decisive effect on the range of uses of the pumice or on the properties of the products to which the pumice of the invention is added. Firstly, the hydrophobicized pumice of the invention can be used in a variety of liquid systems or systems containing a fluid such as make-up water and the like or a solvent or the like. Mention may be made of tile adhesives or board adhesives, lightweight plasters and renders, reinforcing trowel-applied mortars and also varnishes, paints and paste-like systems. Many of these systems are not mixed up only on site but have already been ready-mixed and packaged at the factory, so that it has to be ensured that they retain their fluid or paste-like properties unchanged for a long time. This can advantageously be ensured by use of the granular hydrophobicized pumice of the invention, in contrast to the use of siliceous foam which, as described, has an albeit low water absorption capability. In addition, the fact that the pumice of the invention no longer has any water absorption capability allows more precise setting of the water/cement value when using the pumice as lightweight aggregate for mortar and similar compositions. Furthermore, the apparent particle density of the pumice of the invention can be significantly reduced compared to pure pumice, from about 0.9 kg/dm$^3$ for unhydrophobicized pumice to about 0.5 kg/dm$^3$ for hydrophobicized pumice according to the invention. This leads to an increased productivity and lower dry bulk density of for example, the mortar or tile adhesive which is admixed with the pumice according to the invention. The hydrophobic property of the pumice also enables an improved distribution of this in cement-bonded systems to be achieved, which makes improved, because homogeneous, hydrophobicization of the end product possible. This means that the water absorption capability of the end product is lower compared to other lightweight aggregates.

Overall, the granular hydrophobicized pumice of the invention offers an essential widening of the property spectrum and thus also the use spectrum.

The pumice can, in an embodiment of the invention, be coated with a silane and/or siloxane layer which is hydrophobic. Such a silane or siloxane layer can be applied using various silanes or siloxanes, either cyclic or linear silanes or siloxanes, with, in particular, linear or branched silanes or mixtures thereof or siloxanes which are virtually insoluble in water being suitable. These include, for example, silicone resins or silicone resin solutions, oligomeric siloxanes and polymeric siloxanes. The use of silicones is also possible. In general, any type of alkylpolysiloxanes and/or alkylalkoxysilanes and also siloxane mixtures of reactive organosiloxanes and polydimethylsiloxanes can be used as hydrophobic coating for the pumice surface. Among these, preference is given to using a mixture of reactive organosiloxane compounds and polydimethylsiloxanes, particularly preferably present as emulsion, for forming the coating.

The pumice can also, additionally or alternatively, be coated with a coating of at least one organic fatty acid or at least one salt of an organic fatty acid. Such acids and salts include, for example, stearic acid and various salts of stearic acid, i.e. stearates (e.g. Na, K, Ca, Al, Zn, Zr or $NH_4$ stearate or triethanolammonium stearate), oleic acid and various salts of oleic acid, i.e. oleates (e.g. Na and $NH_4$ oleate) and also tall oil fatty acid and salts thereof and resin acids and salts of resin acids.

In addition or alternatively, the coating of the pumice surface can also consist of a mineral oil or a mineral oil emulsion. Mineral oils consist essentially of a mixture of paraffinic, naphthenic and aromatic constituents and also alkenes.

It is also possible, in addition or alternatively, for the coating of the pumice surface to consist of at least one alkane. These also include waxes and wax oil emulsions, optionally on a paraffin basis. PE/HDPE waxes, microwaxes, Fischer-Tropsch waxes, montan waxes, ester waxes, amide waxes, natural waxes, carnauba waxes, PTFE waxes, wax compounds, polymer-wax compounds or PP waxes are also conceivable.

In addition or alternatively, the pumice surface can also have a coating consisting of bitumen or a bituminous emulsion. This likewise has a strongly water-repellent or hydrophobic behavior.

Apart from the pumice of the invention itself, the invention provides a process for producing pumice of the type described. The process of the invention is characterized in that the granular pumice is wetted with an emulsion containing at least one hydrophobicizing agent which forms the inner phase dispersed in the outer phase and is subsequently dried, with the hydrophobicizing agent forming a hydrophobic coating on the surface of the pumice granules. The hydrophobicizing agent is preferably used as emulsion.

Although it is possible to wet the pumice by dipping in the emulsion, i.e. to pour the pumice into a sufficiently large amount of emulsion, stir it there and allow the emulsion or the hydrophobicizing agent to soak in or become attached and, after a sufficient residence time, take out the pumice, allow it to drip and dry it, an advantageous embodiment of the invention provides for spraying the hydrophobicizing emulsion or a dilution thereof onto the pumice. Spraying-on is advantageously carried out while the pumice is being mixed. That is to say, the pumice is mixed continuously, for example in a plowshare mixer, while the emulsion is sprayed on continuously or intermittently by means of a suitable spraying device so that the emulsion is mixed in as a result of the continuous mixing and thus becomes finely and homogeneously distributed on the surface of the pumice granules. When the emulsion matched to the amount of pumice to be treated and containing a sufficient amount, likewise matched to the amount of pumice to be treated, of added hydrophobicizing agent has all been sprayed on and mixed in, mixing can be continued to achieve further homogenization of the emulsion distribution. At the end of mixing, the pumice is dried in order to drive off the outer phase of the emulsion, i.e. evaporate the water, so that the water-free hydrophobicizing layer is formed.

The basic mixing time should be in the range from 1 minute to 25 minutes, in particular from 10 minutes to 15 minutes, with the emulsion being sprayed on during only part of the total mixing time. For example, spraying-on can be carried out during the first 5 minutes of a total mixing time of 20 minutes and mixing can subsequently be continued for a further 15 minutes in order to homogenize the emulsion or hydrophobicizing agent distribution.

The heat treatment, i.e. the drying of the pumice, is advantageously carried out at a temperature of 0°-200° C., preferably 130°-180° C., so that it is ensured that the water which is generally used as outer phase is driven off as quickly as possible. A preferred drying temperature is about 150° C.

As hydrophobicizing agent, preference is given, according to the invention, to using at least one silane and/or at least one siloxane, with the above-described both cyclic and linear or branched silanes and mixtures thereof being used. Linear silanes or siloxanes in particular display no solubility in water.

In addition, it is possible to use one or more of the above-mentioned silane- and/or siloxane-based materials.

According to the invention, it is possible to use silanes, siloxanes and any mixture thereof with use being made of A1) silane of the general formula

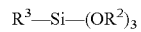

where $R^2$ is a methyl or ethyl radical and $R^3$ is an alkyl radical having from 3 to 12 carbon atoms, or an aminoalkyl radical having from 1 to 6 carbon atoms or a radical of the general formula $H_2N-(CH_2)_xR^4-(CH_2)_y-$, where $R^4$ is an oxygen, sulfur, —NH— or

—NH—$CH_2$—$CH_2$—NH— radical and $x \geq 2$ and $y \geq 2$, or a radical of the general formula

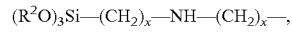

$R^2$ and x are as defined above,

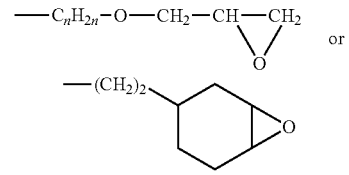

and n is an integer from 1 to 5,

Or

A2) a polysiloxane or siloxanol of the general formula

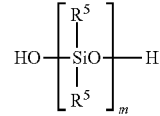

where $R^5$ is a methyl or phenyl radical but at least 90% of the radicals $R^5$ are methyl radicals and m=20 to 250, where a mixture consists of A1) and A2), where the ratio of A1) to A2) is kept so that one SiOH group of the compound A2) corresponds to from >1 to 3 $OR^2$ groups of the compound A1) and $R^2$ is an alkyl radical having from 1 to 4 carbon atoms. Examples of the radical $R^2$ are the methyl, ethyl, propyl and butyl radicals. Preference is given to the methyl and ethyl radicals. Constituent A1) is an alkoxysilane of the general formula $R^3$—Si—$(OR^2)_3$. While the radical $R^2$ has the meaning indicated above, the radical $R^3$ is characterized in that it has a reactive group and is bound via carbon to the silicon atom. $R^3$ can have the following meanings:

(1) $R^3$=aminoalkyl radical whose alkyl radical has from 1 to 6 carbon atoms. Examples of such radicals are the ethyl, propyl, butyl and hexylamine radicals, with preference being given to the radicals —$(CH_2)_3$—$NH_2$ and

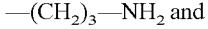

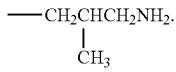

(2) $R^3$=radical of the general formula $H_2H$—$(CH_2)_xR^4$—$(CH_2)_y$—, where $R^4$ is an oxygen, sulfur, —NH— or —NH—$CH_2$—$CH_2$—NH— radical and x≥2 and y≥2. Examples of such radicals are $H_2N$—$(CH_2)_3$— and $H_2N$—$(CH_2)_2$—NH—$(CH_2)_3$—.

(3) $(R^2O)_3Si$—$(CH_2)_x$—NH—$(CH_2)_x$—. Examples of such radicals are $(C_2H_5O)_3Si$—$(CH_2)_3$—NH—$(CH_2)_3$— and $(CH_3)_3Si$—$(CH_2)_2$—NH—$(CH_2)_2$—.

$R^3$=radical of the general formula

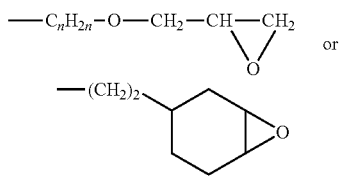

and n is an integer from 1 to 5. An example of a particularly preferred epoxide is

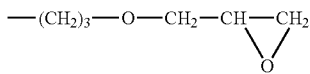

Radicals having the meaning —$(CH_2)_3$—$NH_2$, —$(CH_2)_2$—NH—$(CH_2)_3$—$NH_2$ or (4) are particularly preferred as radicals $R^3$.

Constituent A2) is an α,ω-siloxanol of the general formula

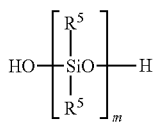

where $R^5$ is a methyl or phenyl radical. At least 90% of the radicals $R^5$ have to be methyl radicals. Particular preference is given to α,ω-dimethylsiloxanols. m is from 20 to 250 and is preferably from 30 to 80.

The ratio of the constituents A1) and A2) has to be set so that one SiOH group of the compound A2) corresponds to from >1 to 3 $OR^2$ groups of the compound A1). The ratio of OH:$OR^2$ is preferably 1:2.

The silanes A1 and/or siloxanols A2 can be used either alone or in any mixtures with one another.

The mixtures can, as solutions, contain solvents such as alcohols, in particular in the absence of water, or in the presence of water be in the form of emulsions.

These products can have an active content of 0.1-100% in water as emulsion or in solvents such as alcohols, hydrocarbons as solution.

These products can have an active content of from 0.1 to 99.9% by weight of silanes A1 and/or of siloxanols A2 dissolved or emulsified in water or dissolved in solvents such as alcohols or hydrocarbons.

A modification of the preparation according to the present invention is characterized in that the components A1) and A2) are not present individually but as their reaction product which can be obtained by completely or partly reacting the components A1) and A2) with one another taking into account the stoichiometric ratios by heating to from 150 to 200° C. before emulsification of these components. It has been found that when such a modified preparation according to the invention is used, good results in respect of the water-repellent effect are likewise achieved.

As hydrophobicizing agent, it is optionally possible to use at least one organic fatty acid or at least one salt of an organic fatty acid either additionally or alternatively. Here, reference is once again made to the organic fatty acids mentioned by way of example above or salts of the organic fatty acids.

The use of a mineral oil as hydrophobicizing agent is also conceivable, either as an alternative or in addition.

The same applies to the use of an alkane as hydrophobicizing agent.

The use of bitumen as hydrophobicizing agent is also conceivable, either in addition or as an alternative.

The content of hydrophobicizing agents, measured in g, in the emulsion should according to the invention be 0.1%-2.5%, in particular 0.3%-1%, of the amount of pumice to be wetted in g. This means that, to hydrophobicize 1 kg of pumice, with a weighed-out amount of for example, 0.5% of hydrophobicizing agent, the emulsion contains an amount of 5 g, for example, of hydrophobicizing agent. The amount of outer phase used, i.e., for example, water, is advantageously also determined by the amount of pumice to be wetted. Thus, the amount of outer phase, in particular water, measured in g, should be ⅕-⅓, in particular ¼, of the amount of pumice to be wetted, likewise measured in g. Based on the example of 1 kg of pumice, 250 g, for example, of water (=250 ml of water) in which, for example, the abovementioned 5 g of hydrophobicizing agent are emulsified should be used.

In various studies and comparative tests, the properties of the pumice according to the invention have been checked and compared with various comparative materials.

A particular amount of pumice according to the invention was firstly produced. Pumice having the trade name "ROTO-CELL" from ROTEC GmbH & Co. KG and having a particle size of 0.09-0.3 mm and a bulk density of 390 kg/m³+/−15% was used as starting material. 400 g of this pumice were weighed out dry.

100 ml of water (=100 g= 25% of the mass of pumice) were then measured out to produce an emulsion. 2 g of hydrophobicizing agent, namely a reactive organosiloxane/PDMS mixture which is obtainable under the trade name "Sitren 595" from Evonik Goldschmidt GmbH (2 g= 0.5% of the mass of pumice), were added to the water. The water and the hydrophobicizing agent were mixed by shaking and the hydrophobicizing agent was thus finely emulsified. The amount of water can naturally be varied. The important thing is that the content of hydrophobicizing agent added is always in the required ratio to the mass of pumice to be wetted, and is also all added to the pumice. The more emulsion in which the amount of siloxane based on the mass of pumice is emulsified that is produced, the more emulsion also has to be mixed with the pumice.

In the next step, the pumice was introduced into a mixer which mixes the pumice by means of a kneading hook. On commencement of mixing, the emulsion was sprayed on using a spray bottle while mixing was carried out continuously. After the spraying-on operation was complete, after about 5 minutes, stirring was continued for another 15 minutes.

When stirring was complete, the wetted pumice was taken out and placed in a dish in a drying oven at 150° C. for drying. The dried pumice was subsequently taken out and cooled in the air of the room.

In a long-term test, the water uptake capability of the pumice according to the invention was firstly examined.

For this purpose, an amount of exactly 500 ml of distilled water was placed in each of two upright cylinders having a reading-off volume of 1000 ml. Exactly 100 g of pumice, obtainable under the trade name "ROTOCELL" and having a particle size of 0.09-0.3 mm, which had not been hydrophobicized according to the invention, were placed in the one upright cylinder. Exactly 100 g of the hydrophobicized "ROTOCELL" pumice produced as described above were placed in the other upright cylinder.

The unhydrophobicized pumice sank immediately after addition. After escape of the air from the pore volume of the pumice, a reading-off volume of 620 ml was determined.

In contrast, the pumice which had been hydrophobicized according to the invention did not sink. A reading-off volume of 720 ml was determined.

After introduction of the pumice and determination of the reading-off volumes, the upright cylinders were closed by means of films so as to be airtight and left to stand in the absence of vibrations.

The samples were allowed to stand for a week, after which the reading-off volumes were determined again. The same reading-off volumes as in the first reading immediately after introduction of the pumice were found, i.e. in the case of the upright cylinder containing the unhydrophobicized pumice, a volume of 620 ml; in the case of the cylinder containing the pumice which had been hydrophobicized according to the invention, a volume of 720 ml. Thus, no changes have occurred.

It can be seen from this that the pumice which has been hydrophobicized according to the invention does not absorb any water, i.e. it is completely hydrophobic.

In a further experiment, three different test specimens of which one contained the inventive pumice which had been produced as described above while the other two contained other aggregates were produced, with properties of the initially produced specimen composition and also properties of the finished specimens being examined.

A commercial tile adhesive (adhesive mortar) based essentially on cement (portland cement), finely particulate aggregates (ground limestone, silica sand) and additives (methylcellulose, dispersion powder, cellulose fibers, high-alumina cement) was used as starting material. Of this three amounts of mortar, each of exactly 600 g, were weighed out.

150 g of a commercial siliceous foam (lightweight foam) having a particle size of 0.1-0.3 mm were added to the first amount. 150 g of the "ROTOCELL" pumice having a particle size of 0.09-0.3 mm but not hydrophobicized were added to the second amount of mortar. 150 g of the above-described "ROTOCELL" pumice according to the invention, hydrophobicized, were added to the third amount of mortar.

Each sample was subsequently mixed with water. 345 g of water were added to the first sample, 375 g to the second sample and 345 g of water to the third sample.

The productivity of the respective samples was then firstly measured. The productivity of the first sample containing the siliceous foam was 870 ml. The sample containing the untreated pumice displayed a productivity of 815 ml. The sample containing the pumice according to the invention displayed a productivity of 900 ml. This means that the pumice according to the invention led to a mortar composition having the greatest productivity, which can be attributed to the hydrophobic property of the pumice and, resulting therefrom, its displacement of water and its homogeneous distribution in the composition.

The fresh overall densities of the made-up samples were subsequently measured. This was 127 kg/dm$^3$ in the case of the sample containing the siliceous foam, 127 kg/dm$^3$ in the case of the second sample containing the untreated pumice and 122 kg/dm$^3$ in the case of the sample containing the pumice according to the invention. This means that the sample containing the pumice according to the invention had a lower density.

In the next step based on the trial for the adhesives in accordance with DIN EN12002, a test specimen in the form of a mortar prism was produced from each composition in order to examine the deformation behavior of the mortar. The respective prism had a length of 160 mm, a width of 80 mm and a height of 80 mm. The prisms produced in each case were dried for a number of days and subsequently measured.

The individual measurements are shown together with the respective amounts of constituents used in the composition in the following table.

|  | Sample: | | |
|---|---|---|---|
|  | I | II | III |
| Lightweight aggregate: | Siliceous foam, particle size: 0.1-0.3 mm | Unhydrophobicized pumice, particle size: 0.09-0.3 mm | Hydrophobicized pumice, particle size: 0.09-0.3 mm |
| Adhesive mortar (g): | 600 | 600 | 600 |
| Mass of aggregate (g) | 150 | 150 | 150 |
| Amount of water (g) | 345 | 375 | 345 |
| Productivity (ml) | 870 | 850 | 900 |
| Fresh overall density of mortar (kg/dm$^3$): | 1.27 | 1.27 | 1.22 |
| Test specimen: Mortar prism L × W × H (mm): | 160 × 80 × 80 | 160 × 80 × 80 | 160 × 80 × 80 |
| Dry weight (g) | 229 | 227 | 223 |

-continued

| | Sample: | | |
|---|---|---|---|
| | I | II | III |
| Dry overall density (kg/dm³): | 0.224 | 0.221 | 0.218 |
| Fracture load in bending (kN): | 0.487 | 0.408 | 0.449 |
| Bending tensile strength (N/mm²): | 0.143 | 0.12 | 0.132 |
| Fracture load in compression (kN): | 4.39 | 3.56 | 4.52 |
| Compressive strength (N/mm²): | 0.7 | 0.6 | 0.71 |

Firstly, the dry weight of the specimens was measured. This was 229 g in the case of the test specimen containing the siliceous foam, 227 g in the case of the test specimen containing the untreated pumice and 223 g in the case of the test specimen containing pumice according to the invention. This means that the test specimen containing the pumice according to the invention was the lightest of all the test specimens.

Furthermore, the dry overall density was measured. This was 0.224 kg/dm³ in the case of the test specimen containing the siliceous foam, 0.221 kg/dm³ in the case of the test specimen containing the untreated pumice and 0.218 kg/dm³ in the case of the test specimen containing the pumice according to the invention. The test specimen containing the pumice according to the invention thus displayed the lowest dry overall density.

The fracture load in bending, the bending tensile strength, the fracture load in compression and the compressive strength were then measured. The detailed measurements may be found in the table.

The fracture load of the specimen containing the siliceous foam was 0.487 kN. While the fracture load of the specimen containing the untreated pumice was, at 0.408 kN, significantly below the value for the specimen containing siliceous lightweight foam, the specimen comprising the pumice according to the invention had a measured value of 0.449 kN, approximately in the region of the specimen containing siliceous lightweight foam.

The bending tensile strength of the siliceous foam specimen was 0.143 N/mm². Here too, the specimen comprising the untreated pumice was, at 0.12 N/mm², significantly lower, while the specimen comprising the pumice according to the invention gave a value of 0.132 N/mm², once again approximately in the region of the siliceous foam specimen.

In the case of the fracture load in compression, the specimen containing the pumice according to the invention displays the highest measured value at 4.52 kN, while the specimen containing the siliceous foam had a value of 4.39 kN and the specimen comprising the untreated pumice had a value of 3.56 kN. In the case of the compressive strength, too, the specimen comprising the pumice according to the invention had, at 0.71 N/mm², the highest value, compared to 0.7 N/mm² in the case of the siliceous foam specimen and 0.6 N/mm² in the case of the specimen comprising the untreated pumice.

The comparative experiment shows that use of the pumice according to the invention makes it possible to mix, for example, a tile adhesive which firstly has a very good productivity and secondly, as the various test specimens showed, has very good mechanical properties compared to, in particular, the mortar/test specimen containing the siliceous foam.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:
1. A granular pumice comprising:
a surface coated with a hydrophobic coating;
wherein the coating comprises a silane or a siloxane;
wherein the silane is:
A1) a silane of the general formula:

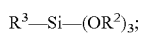

where:
$R^2$ is a methyl or ethyl radical; and
$R^3$ is:
an alkyl radical having from 3 to 12 carbon atoms; or
an aminoalkyl radical having from 1 to 6 carbon atoms; or
a radical of the general formula

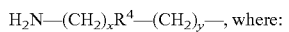

$R^4$ is an oxygen, sulfur, —NH—, or —NH—CH$_2$—CH$_2$—NH— radical;
x≥2; and
y≥2; or
a radical of the general formula:

where $R^2$ and x
are as defined above;

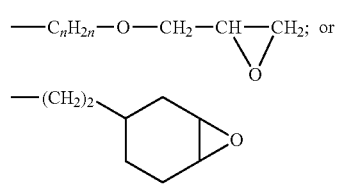

where n is an integer from 1 to 5,
wherein the siloxane is:
A2) a siloxanol of the general formula:

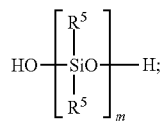

where:
$R^5$ is a methyl or phenyl radical, with at least 90% of the radicals $R^5$ being methyl radicals; and
m=20 to 250.

2. The granular pumice as claimed in claim 1;
   wherein the coating additionally comprises at least one compound selected from organic fatty acids and salts of organic fatty acids.
3. The granular pumice as claimed in claim 1;
   wherein the coating additionally comprises a mineral oil or a mineral oil emulsion.
4. The granular pumice as claimed in claim 1:
   wherein the coating additionally comprises at least one alkane.
5. The granular pumice as claimed in claim 1;
   wherein the coating additionally comprises bitumen or a bituminous emulsion.
6. A process for producing the granular pumice as claimed in claim 1, comprising:
   wetting the surface of the granular pumice with an emulsion containing at least one hydrophobicizing agent which is distributed in an outer phase of the emulsion, and which forms the inner phase of the emulsion; and
   subsequently drying the granular pumice, so that the hydrophobicizing agent forms the hydrophobic coating on the surface of the granular pumice.
7. The process as claimed in claim 6;
   wherein the emulsion is sprayed on.
8. The process as claimed in claim 6;
   wherein the granular pumice is mixed during and after addition of the emulsion.
9. The process as claimed in claim 8;
   wherein the mixing time is 1 min to 25 min.
10. The process as claimed in claim 6;
    wherein the wetted granular pumice is dried at a temperature of 0°–200° C.
11. The process as claimed in claim 6;
    wherein the hydrophobicizing agent additionally comprises at least one compound selected from organic fatty acids and salts of organic fatty acids.
12. The process as claimed in claim 6;
    wherein the hydrophobicizing agent additionally comprises mineral oil.
13. The process as claimed in claim 6;
    wherein the hydrophobicizing agent additionally comprises an alkane.
14. The process as claimed in claim 6;
    wherein the hydrophobicizing agent additionally comprises bitumen.
15. The process as claimed in claim 6;
    wherein the outer phase of the emulsion comprises water.
16. The process as claimed in claim 6;
    wherein a content in grams of the hydrophobicizing agent in the wetted granular pumice is 0.1% to 2.5% of an amount in grams of granular pumice which is wetted.
17. The process as claimed in claim 6;
    wherein an amount in grams of the outer phase of the emulsion is $\frac{1}{5}$ to $\frac{1}{3}$ of an amount in grams of granular pumice which is wetted.

\* \* \* \* \*